J. LEAKEN.
Churn Dasher.
No. 70,229.
Patented Oct. 29, 1867.
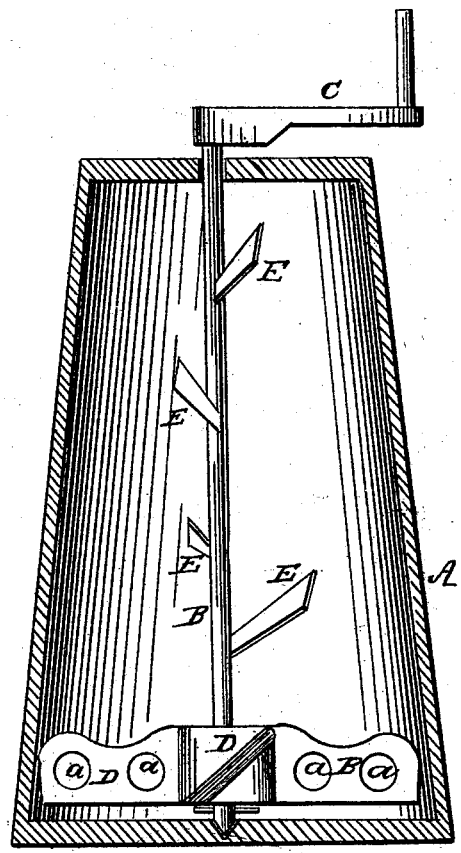

UNITED STATES PATENT OFFICE.

JOHN LEAKEN, OF CLINTON, ILLINOIS, ASSIGNOR TO HIMSELF AND F. H. BOGAR, OF SAME PLACE.

IMPROVEMENT IN CHURN-DASHERS.

Specification forming part of Letters Patent No. 70,229, dated October 29, 1867.

*To all whom it may concern:*

Be it known that I, JOHN LEAKEN, of Clinton, in the county of De Witt and State of Illinois, have invented a new and useful Improvement in Churn-Dashers; and I do hereby declare that the following is a full, clear, and exact description thereof, which will enable those skilled in the art to make and use the same, reference being had to the accompanying drawings, and to the letters of reference marked thereon.

The present invention relates to an improvement in churn-dashers, which is of such nature that, in churning the butter from the milk or cream, the milk is worked from the bottom of the churn to the top, and the gathering together of the butter greatly facilitated.

In the accompanying plate of drawings, my improvement in churn-dashers is illustrated, the figure being a side view of a dasher made according thereto, and arranged within a churn-box, shown in central vertical section.

A in the drawings represents the box or case of the churn, having arranged in its center a vertical shaft, B, provided with a handle, C, upon the outside of the box, for convenience in turning or operating it. This shaft B, at its lower end, has four radial arms or wings, D, each of which has perforations $a$ through it, from side to side, the face or sides of each wing D being slightly inclined in direction. E, a series of arms or prongs to churn-dash staff B, above the arms or wings D thereto.

By these arms E and wings D to the staff B the churning of butter is secured, and in the most expeditious manner, the milk being gathered together at the top, with the butter at the bottom.

Having thus described my invention, I claim as new and desire to secure by Letters Patent—

A dasher for churns, provided with wings and arms, substantially as and for the purpose described.

The above specification of my invention signed by me.

JOHN LEAKEN.

Witnesses:
F. H. BOGAR,
JOHN R. BLACKFORD.